United States Patent [19]

Kellogg

[11] Patent Number: 4,544,171

[45] Date of Patent: Oct. 1, 1985

[54] ANTI-SWAY CLIP FOR REAR GATE OF SHOPPING CART BASKET

[75] Inventor: Guy Kellogg, Battle Creek, Mich.

[73] Assignee: United Steel & Wire Company, Battle Creek, Mich.

[21] Appl. No.: 544,317

[22] Filed: Oct. 21, 1983

[51] Int. Cl.⁴ ............................................. B62B 11/00
[52] U.S. Cl. ................................. 280/33.99 A; 49/381
[58] Field of Search ................... 280/33.99 R, 33.99 A, 280/33.99 H; 211/181; 49/381, 394; 5/100; 292/300

[56] References Cited

U.S. PATENT DOCUMENTS 3,433,496  3/1969  Kampf ........................... 280/33.99 R
4,124,954  11/1978  Redick ............................. 49/381 X

OTHER PUBLICATIONS

Sketch of Unarco cart basket.
United Ultra II Model 2599 brochure.

Primary Examiner—Joseph F. Peters, Jr.
Assistant Examiner—Michael Mar
Attorney, Agent, or Firm—Flynn, Thiel, Boutell & Tanis

[57] ABSTRACT

A shopping cart having an anti-sway bracket secured to the rear cross wire of the basket bottom wall for sidewardly confining the central vertical wires of the rear gate when in its closed position for minimizing side sway of the basket. This bracket comprises a single wire element which is shaped like a "W" and is suitably welded to the rear cross wire of the basket bottom wall.

7 Claims, 4 Drawing Figures

ANTI-SWAY CLIP FOR REAR GATE OF SHOPPING CART BASKET

FIELD OF THE INVENTION

This invention relates to a shopping cart of the type having a basket provided with a rear gate which hingedly swings upwardly into the basket to permit nesting of like carts and, in particular, to an improved anti-sway structure which sidewardly embraces the rear gate when in its basket-closing position.

BACKGROUND OF THE INVENTION

Shopping carts have long and extensively been utilized in supermarkets and the like. One of the carts which has been utilized for many years employs an upwardly opening basket supported on a wheeled base, which basket typically employs front, side and bottom walls which are rigidly formed from wire, with the side walls typically being in tapered relationship to permit the baskets of like carts to nest one within the other. To permit such nesting, the rear of the basket is closed by a rear gate which is hingedly supported adjacent its upper edge, with the lower edge of the gate when in the closed position being abutted against a rear cross wire associated with the basket bottom wall. This gate, which also normally supports thereon a baby seat, swings inwardly and upwardly into the basket to permit the front end of a second cart basket to nest inside the basket of the first-mentioned cart. The rear gate is hence supported solely by the hinge at the upper edge thereof. This necessarily results in the basket having a limited amount of side sway, which, while it does not significantly affect the strength of the basket, has nevertheless created an undesirable "feel" when the cart is in use. Typical carts of this general construction are illustrated by U.S. Pat. Nos. 2,890,057, 2,891,801 and 3,713,358.

In an attempt to eliminate this side sway, one cart has recently incorporated a structure for confining the rear gate when in its closed position. This confining structure comprises a pair of abutment members secured to the bottom wall of the basket at the rear edge thereof, which abutment members are disposed directly adjacent the opposite side walls to sidewardly confine the lower edge of the gate therebetween when the latter is in its closed position. These abutment members, which resemble inverted cups, are large and bulky and, when mounted on the cart, create an unsightly appearance. Further, the required use of two of these members not only increases the cost of material and manufacture, but also the cost of assembly. These abutment members also create additional cracks and crevices, particularly adjacent the side walls of the basket, which collect dirt and make cleaning of the basket more difficult.

Accordingly, it is an object of this invention to provide a shopping cart having an improved anti-sway structure associated with the rear gate of the basket, which car overcomes many of the disadvantages associated with the prior cart described above. More specifically, the improved cart of this invention has an improved anti-sway bracket secured to the rear cross wire of the basket bottom wall for sidewardly confining the central vertical wires of the rear gate when in its closed position. This provides substantially increased side strength and prevents, or substantially minimizes, side sway or racking of the basket. This bracket comprises a single wire element which has a shape resembling a "W" and is suitably welded to the rear cross wire of the basket bottom wall. This permits the anti-sway structure to be manufactured and assembled on the basket efficiently and economically, and the resulting structure does not detract from the appearance of the basket. In fact, the bracket is substantially non-noticeable when mounted on the cart. At the same time, this structure does not create any significant dirt-collection problems and still permits the basket to be easily cleaned.

Other objects and purposes of the invention will be apparent to persons familiar with carts of this general type upon reading the following specification and inspecting the accompanying drawings.

Figure 1:
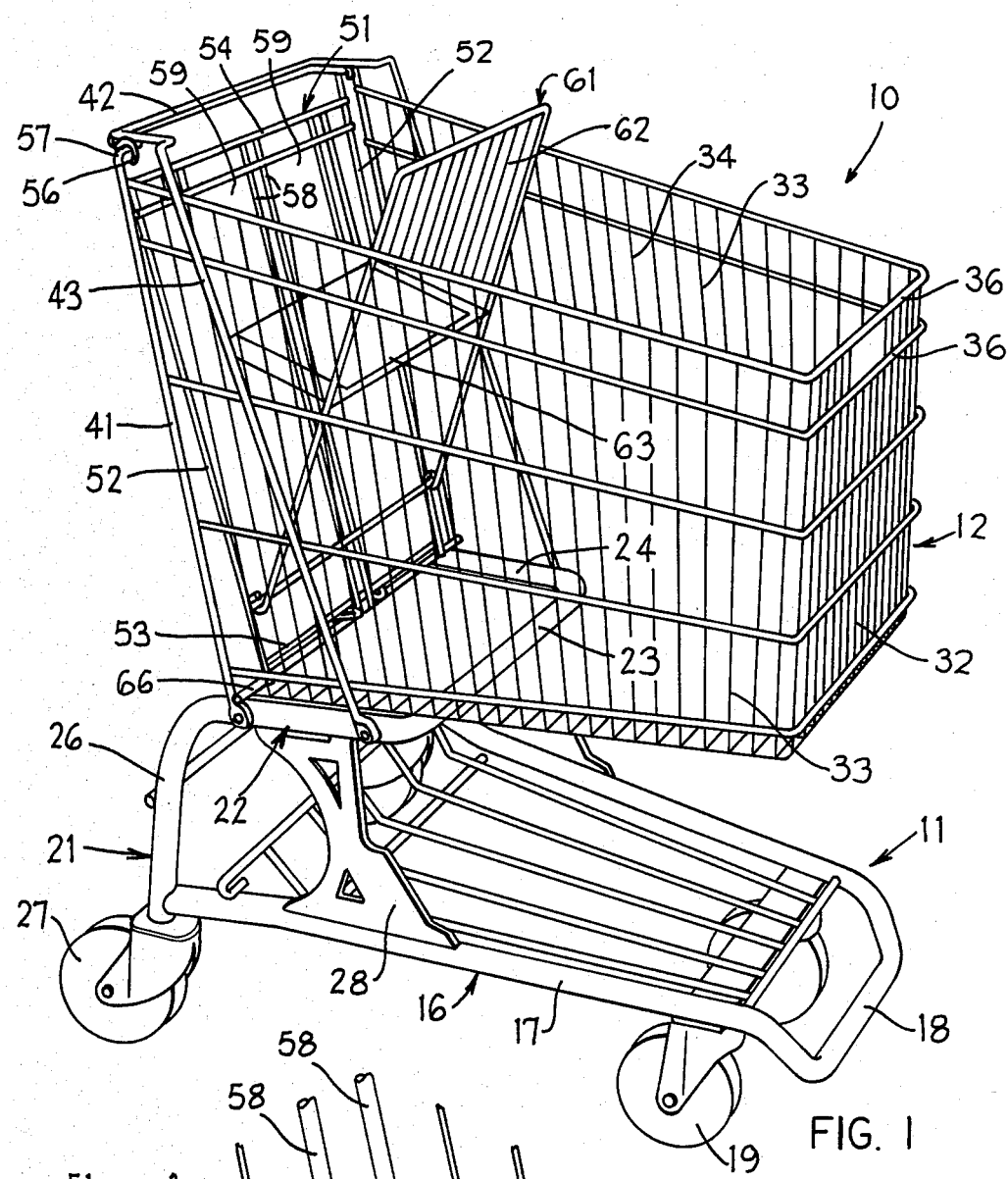
FIG. 1 is a perspective view of a conventional shopping cart employing the improved anti-sway structure of this invention.

Certain terminology will be used in the following description for convenience in reference only and will not be limiting. For example, the words "upwardly", "downwardly", "rightwardly" and "leftwardly" will normally refer to directions in the drawings to which reference is made, but they will also refer to directions relative to the cart, particularly directions relative to a person standing behind the cart adjacent the handle thereof. The words "inwardly" and "outwardly" will refer to directions toward and away from, respectively, the geometric center of the cart and designated parts thereof. The work "front" will refer to the end of the cart opposite the handle, namely the rightward end in FIG. 1, and "back" will refer to the opposite end. Said terminology will include the words specifically mentioned, derivatives thereof, and words of similar import.

DETAILED DESCRIPTION

FIG. 1 illustrates therein a shopping cart 10 which includes a wheeled base 11 supporting an upwardly opening basket 12 thereon.

The base 11 includes a U-shaped bottom frame rail 16 which defines a pair of converging side rails 17 having an integral front rail or bright portion 18 at the forward end thereof. A pair of conventional casters 19 are supported under the front end of the base rail. The rearward ends of the side rails 17 are fixedly joined, as by welding, to a further U-shaped frame member 21 which includes a U-shaped basket portion 22 which is spaced upwardly from the base rail 16 in approximately parallel relationship therewith. This basket-supporting portion 22 includes a front leg or cross rail 23 which extends across beneath the basket and terminates in side rails 24 which project rearwardly toward the rear of the basket and then bend downwardly so as to define rear legs 26 which, at their lower ends, have rollers 27 mounted thereon. Suitable reinforcing braces 28 extend between and are fixedly connected to the vertically spaced rails 17 and 24. The lower base rail 16 also conventionally supports a tray 28 thereon.

The base 11 is of a generally tapered or converging configuration as it projects forwardly from the rear end thereof so as to permit the base of one cart to partially nest within the base of the next forwardmost cart to facilitate storage of like carts.

The construction of the base 11, as briefly described above, is conventional so that further detailed description thereof is believed unnecessary.

The basket 12, in the illustrated and preferred embodiment, is constructed of wire rod. The basket includes a bottom wall 31, and upright front wall 32, and a pair of opposed side walls 33, which walls are all integrally and rigidly joined together. These walls are all formed from a plurality of intersecting metal wires or rods 34 which are suitably welded together at their intersection points so as to define a gridlike structure. The front and side walls include a plurality of rod elements 36 which are U-shaped and extend across the front wall and longitudinally rearwardly of the side walls, at least one of these rods 36 defining the upper edge of the basket. The bottom wall 31, which is supported on the basket support 21, is slightly upwardly sloped as it projects forwardly. The opposed side walls also have a slight converging relationship therebetween as they project forwardly. These relationships permit the baskets of like carts to nest one within the other during storage.

The rear vertical edges of the side walls 33 are defined by upright rods or posts 41 which have their lower ends fixedly secured to the base, as to the side legs 24 of the basket support. The upper ends of these posts 41 project upwardly above the upper edge of the basket side walls, and a horizontally extending rodlike handle 42 is fixed to an extends between the upper ends of these posts 41. A further pair of upright support posts 43 are also provided adjacent the opposite side walls, which posts 43 have their upper ends joined to the upper ends of the posts 41. The posts 41 and 43 are an integral structure formed from a single wire rod in the illustrated embodiment. These posts 43 extend downwardly along the outer sides of the side walls 33, and are sloped forwardly as they project downwardly in diverging relationship to the rear posts 41. The lower ends of posts 43 are also fixedly secured to the side legs 24 of the basket support.

The rear of basket 12 is closed by means of an end or rear gate 51, this gate also being formed from a plurality of intersecting wire rods which form a grid-like structure. The gate 51 includes an outer substantially rectangular frame formed by opposite side rods 52 which are rigidly joined together at their lower ends by a bottom cross rod 53, and are rigidly joined together adjacent their upper ends by a top cross rod 54. The upper ends of the side rods 52 have hook portions 56 formed thereon which are hingedly supported on small horizontally in-turned portions 57 provided at the upper ends of the posts 41, whereby these hook portions 56 effectively define a horizontal axis which extends crosswise of the cart in the vicinity of but below the handle 42 so as to permit vertical swinging of the rear gate about a substantially horizontal axis.

The rear gate 51 includes several upright or vertical intermediate wires which fixedly extend between the upper and lower rods 53 and 54, including a pair of parallel wires 58 which are positioned substantially at the center of the gate. These center vertical wires 58 define, on opposite sides thereof, leg openings 59. Gate 51 also mounts thereon a conventional collapsible baby seat assembly 61 which includes a back rest portion 62 having the lower end thereof hingedly mounted on the rear gate, and a seat portion 63 which extends between the rear gate and the back portion directly below the leg openings 59.

When the rear gate is in the normal closed position as illustrated, the lower cross wire 53 thereof is positioned closely adjacent but just slightly upwardly from the bottom wall 31. However, the bottom wall 31, at the rearward free edge thereof, has a cross wire 66 extending horizontally between the side walls and positioned above the wire elements 67 which project forwardly and define the bottom wall 31. This cross wire 66 effectively acts as a stop for engaging the lower ends of the side rods 52 and intermediate rods 58 of the gate to hold the latter in its closed position. However, when in this closed position, the side rods 52 are spaced a substantial distance from the basket side walls 33 to provide sufficient clearance to enable the gate 51 to freely swing inwardly into the basket.

The structure of the basket 12, including the rear gate 51 and the baby seat assembly 61, is conventional.

Figure 2:
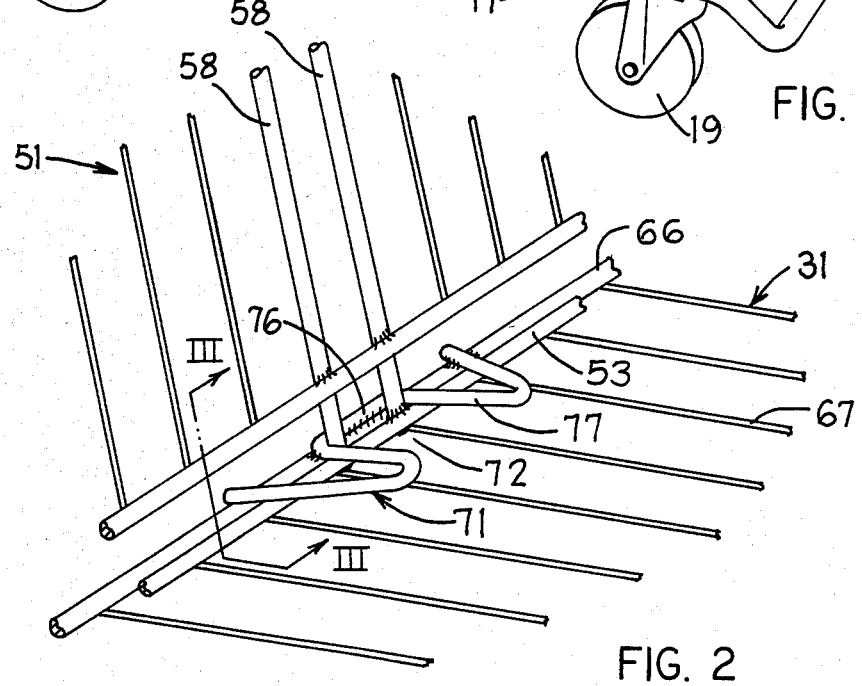
FIG. 2 is an enlarged, fragmentary perspective view illustrating the improved anti-sway structure and its cooperation between the basket bottom wall and the rear gate when the latter is in its closed position.
Figure 3:
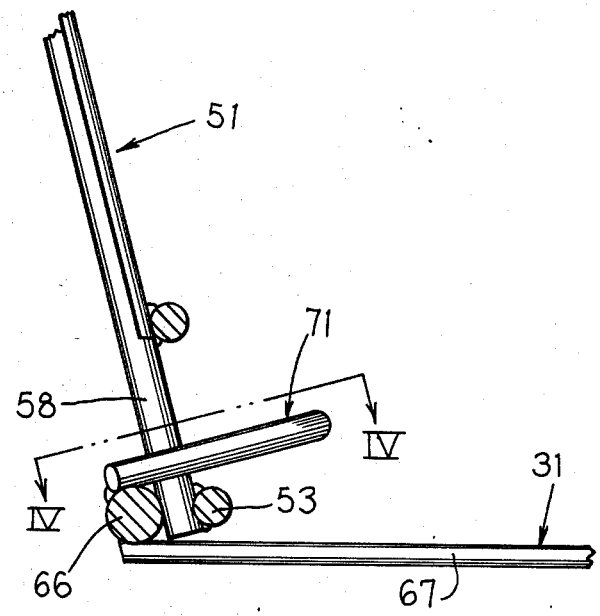
FIG. 3 is an enlarged, fragmentary sectional view as taken substantially along line III—III in FIG. 2.
Figure 4:
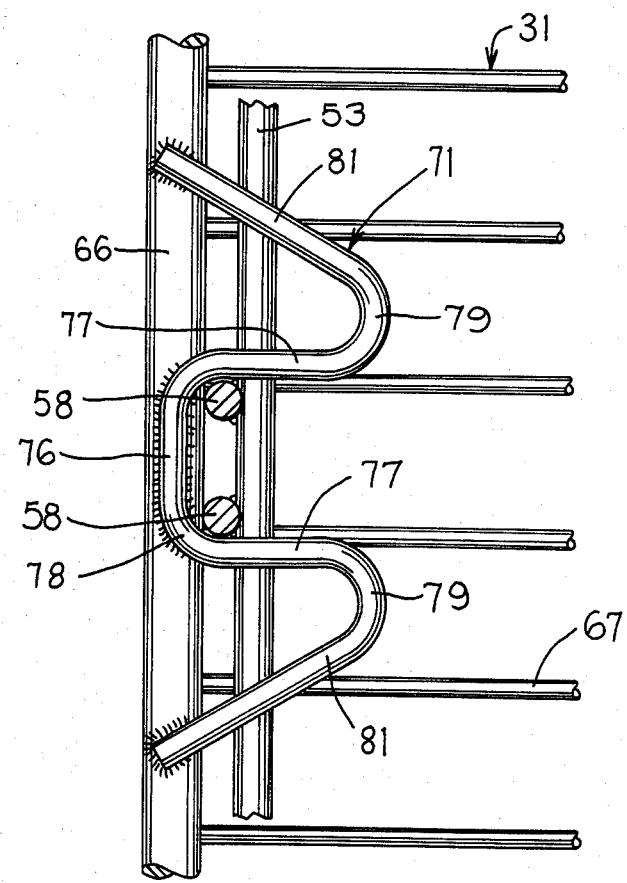
FIG. 4 is a fragmentary sectional view taken substantially along lines IV—IV in FIG. 3.

Referring now to FIGS. 2-4, the basket 12 is provided with the improved anti-sway structure of this invention thereon, which anti-sway structure comprises a one-piece clip or bracket 71. This bracket is fixedly secured to the bottom wall of the basket adjacent the center of the rear edge thereof. This clip 71, when viewed from the top thereof, has a configuration which resembles a "W", and defines a forwardly directed slot or channel 72 which is adapted to sidewardly embrace the center upright rods 58 of the rear gate when the latter is in its closed position.

The anti-sway clip 71, as illustrated by FIG. 2, has a U-shaped center portion which includes a bight 76 which overlies and is fixedly secured, as by welding, to the rear basket cross rod 66. This bight 76 is integral with a pair of forwardly projecting, parallel side legs 77 which project forwardly in upwardly spaced relationship from the bottom wall 31. These legs 77 define the slot 72 therebetween, which slot 72 has a width which is only slightly larger than the maximum width defined by the parallel center wires 58 so as to snugly accommodate them therebetween, as illustrated by FIG. 4. The snug fit of the wires 58 within the rearward end of slot 72 is further facilitated by the narrowing of the slot at the rear end caused by the rounded corners 78. The legs 77, at their outer ends, terminate in rod portions 79 which are rounded outwardly in opposite directions to form a somewhat enlarged or flared mouth at the open end of the slot 72 to facilitate entry of rods 58 therebetween. These rod portions 79 are bent through an angle which approaches but is slightly less than 180°, and they in turn terminate in rearwardly projecting straight leg portions 81 which define the outer legs of the clip and, at their free ends, overlie and are welded to the rear basket cross rod 66.

As illustrated by FIG. 3, the anti-sway clip 71 is sloped upwardly at a small acute angle relative to the bottom wall 31 as the clip projects forwardly away from the rear cross wire 66. This slope facilitates the angular swinging of the rear gate 51 inwardly and upwardly of the basket into its open position.

During normal operation of the cart, the weight of the rear gate maintains it in its closed position, in which position the lower ends of rods 52 and 58 abut the rear cross wire 66. When the basket is provided with the anti-sway clip 71 of this invention, then the pair of center wires 58 are positioned within the slot 72 and are closely sidewardly confined between the opposed rod portions 77. This prevents any sideward displacement of the lower end of the rear gate, and thereby provides greatly increased side rigidity at the lower end of the rear gate so as to prevent or minimize sideward sway of the basket when the rear gate is in its lowered or use position.

However, when nesting of carts is desired, the forward end of a basket on one cart is pushed against the rear gate of the next forwardmost cart. The rear gate of the forward cart swings inwardly and upwardly to permit nesting of the baskets between the two carts, and the anti-sway clip 72 does not in any way interfere with the nesting operation. However, when the two nested carts are separated or moved out of nested relationship, the weight of the rear gate swings it downwardly into its use position. When the rear gate approaches the rear cross rod 66, any sideward distortion of the basket due to the nesting relationship may result in the center rods 58 being slightly misaligned relative to the slot 72. However, due to the flare opening at the open end of the slot, as defined by the rounded portions 79, the center rods 58 will be automatically cammed sidewardly to the degree necessary so as to cause the rods 58 to slidably enter into the slot 72 until the end gate abuts against the cross rod 66. Hence, the end gate is again securely held by the clip 71 so as to prevent or greatly minimize sideward sway of the basket.

The improved anti-sway clip 71 of this invention is desirable since it comprises only a single one-piece element which can be easily welded to the cross rod 66 adjacent the center thereof, whereby the clip does not detract from the appearance of the basket. At the same time, this clip 71 is still of wire rod and hence can be welded to and chrome plated along with the rest of the basket, and the clip does not create any additional problems with respect to collecting of dirt or cleaning of the basket. The clip also does not interfere with utilization of the basket for storage of goods.

While the above description relates to a basket which has been described as being constructed of wire rod, it will be appreciated that the basket could also be constructed of other materials, such as plastic or other comparable materials.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a nestable shopping cart having a wheeled base, and an upwardly opening basket supported on said base, said basket including a bottom wall which is fixed to said base and has a cross member extending along the rear edge thereof, said cross member defining a forwardly facing abutment surface thereon, said basket also including a pair of side walls and a front wall which extend upwardly from the respective edges of the bottom wall, all of said walls being rigidly joined together, and a swingable rear gate for closing the rear of said basket, said rear gate extending between the side walls and having means associated with the upper end thereof for hingedly supporting same relative to said side walls for permitting the rear gate to be moved between a closed position wherein it closes off the rear of the basket and an open position wherein the gate swings inwardly and upwardly relative to the basket to permit nesting between baskets of two like carts, said rear gate having structure at the lower free end thereof which abuts said cross member when the gate is in said closed position, said gate also having rod means disposed substantially at the center thereof and extending vertically between the upper and lower edges thereof, the improvement comprising anti-sway means fixedly mounted on the bottom wall of said basket adjacent the center of the rear edge thereof for sidewardly confining said center rod means when said gate is in said closed position, said anti-sway means including a U-shaped part having a bight portion which is fixed to said cross member adjacent the middle thereof, said bight portion extending between and being fixedly connected to a pair of substantially parallel leg portions which define a slot therebetween which opens forwardly toward the front wall of the basket, said leg portions projecting forwardly only a small extent away from said cross member, said leg portions at their forward ends being rounded outwardly away from one another to define a widened flared opening at the open outer end of the slot, and said center rod means being closely sidewardly confined within said slot when said gate is in said closed position.

2. A cart according to claim 1, wherein the leg portions at the forward ends thereof are integral with curved portions which are bent outwardly in opposite directions through angles which approach 180°, said curved portions being joined to free leg portions which project rearwardly and are fixedly joined to said cross member.

3. A cart according to claim 1, wherein said anti-sway means comprises a one-piece clip having a substantially W-shaped configuration when viewed from above, said U-shaped part being defined at the middle of the W-shaped configuration so that the bight of the U-shaped part is fixedly secured to the cross member, the legs of the U-shaped part at the ends thereof opposite said bight being bent outwardly and rearwardly so as to define outer leg portions which have their free ends fixedly secured to said cross member.

4. A cart according to claim 3, wherein the W-shaped clip is spaced upwardly a small distance above the upper surface of the bottom wall, and wherein the rear gate has a bottom cross element at the lower free edge thereof which is positionable vertically between the clip and the upper surface of the bottom wall when the gate is in its closed postion.

5. A cart according to claim 3, wherein the center rod means comprise a pair of parallel wire rods which are positioned closely adjacent but in spaced relationship, said gate means having a pair of openings therethrough adjacent the opposite sides of said pair of center rods, said pair of center rods being snugly and sidewardly confined within the slot of the anti-sway clip when the latter is in its closed position.

6. In a nestable shopping cart having a wheeled base, and upwardly opening basket mounted on said base, said basket having a bottom wall fixed to the base and side and front walls fixed to the bottom wall and to one another and projecting upwardly from the edges of the bottom wall, said bottom wall having an upper surface defining a support surface for goods deposited in the basket, the bottom wall also having a free rear edge extending thereacross, a cross member extending along the free rear edge of the bottom wall and projecting slightly upwardly above said upper surface, and a rear gate for closing off the rear of the basket, said rear gate having hinge means for swingably supporting the gate adjacent the rear upper corners of the side walls so that the gate can be swingably moved between a closed position wherein the gate closes off the rear of the basket and an open position wherein the gate is swung inwardly and upwardly into the basket to permit nesting of like carts, said gate having structure at the lower free end thereof which abuts said cross member when the gate is in said closed position, and anti-sway means coacting between said basket and said gate when the latter is in said closed position for minimizing sideward sway of the basket, the improvement wherein said anti-sway structure comprises a one-piece anti-sway clip which is fixed to the basket adjacent the center of the rear free edge of said bottom wall and defines a forwardly directed slot which is closed at its rearward end, said anti-sway clip projecting forwardly relative to said cross member through only a short extent, said clip being substantially W-shaped when viewed from above and includes center legs which define said slot, said center legs being joined by a base portion which is fixed to said cross member, said W-shaped clip also having outer legs which at their free ends are also fixed to said cross member, and said gate adjacent the lower free edge thereof, substantially at the center of the gate as measured between the sides thereof, having vertically extending means which enter into the slot and is closely sidewardly confined within the slot when the gate is in said closed position.

7. In a nestable shopping cart having a wheeled base, and an upwardly opening basket supported on said base, said basket including a bottom wall which is fixed to said base and has a cross member extending along the rear edge thereof, said cross member defining a forwardly facing abutment surface thereon, said basket also including a pair of side walls and a front wall which extends upwardly from the rear edges of the bottom wall, all of said walls being rigidly joined together, and a swingable rear gate for closing the rear of said basket, said rear gate extending between the side walls and having means associated with the upper end thereof for hingedly supporting same relative to said side walls for permitting the rear gate to be moved between a closed position wherein it closes off the rear of the basket and an open position wherein the gate swings inwardly and upwardly relative to the basket to permit nesting between baskets of two like carts, said rear gate having a transversely extending structure at the lower free end thereof which abuts said cross member when the gate is in said closed position, said gate also having rod means disposed substantially at the center thereof and extending vertically between the upper and lower edges thereof, the improvement comprising anti-sway means fixedly mounted on the bottom wall of the basket adjacent the center of the rear edge thereof for sidewardly confining said center rod means when said gate is in said closed position, said anti-sway means including a pair of substantially parallel but sidewardly spaced leg portions which are fixed to said cross member adjacent the middle thereof and project forwardly therefrom through only a small extent, said leg portions defining a slot therebetween which opens forwardly toward the front wall of the basket, said leg portions at their forward ends being rounded outwardly away from one another to define a widened flared opening at the open outer end of the slot, said center rod means of said gate being closely sidewardly confined within said slot when said gate is in said closed position, said leg portions being spaced upwardly only a small distance above the bottom wall of the basket, and the transversely extending structure being positioned vertically between said bottom wall and said leg portions when the gate is in said closed position.

* * * * *